(12) United States Patent
Mohlmann et al.

(10) Patent No.: US 7,464,618 B2
(45) Date of Patent: Dec. 16, 2008

(54) HYDRAULIC CONTROL APPARATUS FOR AN AUTOMATIC DUAL CLUTCH TRANSMISSION

(75) Inventors: Reinhard Mohlmann, Köln (DE); Martin Leibbrandt, Bedburg (DE); Ulrich Eggert, Viersen (DE)

(73) Assignee: Getrag Ford Transmissions GmbH, Cologne (DE)

( * ) Notice: Subject to any disclaimer, the term of this patent is extended or adjusted under 35 U.S.C. 154(b) by 245 days.

(21) Appl. No.: 11/213,650

(22) Filed: Aug. 26, 2005

(65) Prior Publication Data
US 2006/0046897 A1 Mar. 2, 2006

(30) Foreign Application Priority Data
Sep. 2, 2004 (EP) .................. 04104218

(51) Int. Cl.
*F16H 3/22* (2006.01)
(52) U.S. Cl. .............. 74/346; 74/329; 74/340; 477/143; 477/156; 477/158; 477/164
(58) Field of Classification Search ........... 477/164
See application file for complete search history.

(56) References Cited

U.S. PATENT DOCUMENTS

| 5,240,093 | A | * | 8/1993 | Wagner et al. ......... 192/3.58 |
| 6,568,515 | B2 | * | 5/2003 | Harries ............... 192/3.58 |
| 7,127,961 | B2 | * | 10/2006 | Braford et al. .......... 74/340 |
| 7,163,096 | B2 | * | 1/2007 | Neuner ............... 192/87.1 |

FOREIGN PATENT DOCUMENTS

| DE | 41 17 736 C1 | 5/1991 |
| DE | 101 34 115 A1 | 7/2001 |
| EP | 1 150 040 A2 | 4/2001 |
| EP | 1 400 733 A2 | 8/2003 |

* cited by examiner

*Primary Examiner*—David D. Le
(74) *Attorney, Agent, or Firm*—Schlee IP International, P.C.; Alexander R. Schlee

(57) ABSTRACT

A hydraulic control apparatus and method of controlling it for an automatic dual clutch transmission, which includes a first clutch with a first partial transmission and a second clutch with a second partial transmission, as well as a shifting system for engaging/releasing gears of the two partial transmissions. A first switching valve in a first position $A_I$ connects a first pressure regulator to the first clutch and disconnects it from the shifting system and in a second position $B_I$ connects the first pressure regulator to the shifting system and disconnects it from the first clutch, and that a second switching valve in a first position $A_{II}$ connects a second pressure regulator to the second clutch and disconnects it from the shifting system and in a second position $B_{II}$ connects the second pressure regulator to the shifting system and disconnects it from the second clutch.

18 Claims, 3 Drawing Sheets

HYDRAULIC CONTROL APPARATUS FOR AN AUTOMATIC DUAL CLUTCH TRANSMISSION

Priority from the European Patent Application 04104218.5 is claimed, the content of which is herewith incorporated entirely by reference.

BACKGROUND OF THE INVENTION

The invention relates to a hydraulic control apparatus for an automatic dual clutch transmission, and to a method for controlling the transmission using the hydraulic control apparatus.

Dual clutch transmissions have long been known and are preferably used in motor vehicles. A dual clutch transmission generally has two partial transmissions, each of which are assigned a separate clutch and a set of gears. On account of the considerable mechanical outlay involved in actuating the two clutches and shifting the gears of the two partial transmissions, dual clutch transmissions are generally automatic, i.e. both the actuation of the clutches and the shifting of the gears are effected by associated auxiliary drives which, by way of example, may be designed in the form of hydraulically operated actuators which are actuated by a hydraulic control device.

Known hydraulic control apparatuses for dual clutch transmissions have generally complex control methods with a large number of valves. For example, it is known from DE 101 34 115 A1 for a first clutch and a second clutch each to be assigned a flow-regulating valve and for the actuators for shifting the gears each to be assigned a pressure-regulating valve. DE 41 17 736 C1 discloses providing a switching apparatus between a first and second pressure regulator, on the one hand, and the first and second clutch and the actuators for shifting the gears, on the other hand, with the result that a controlled pressure, generated by the pressure regulators, is passed either onto the clutches or onto one of the actuators. This switching operation allows the number of control valves required to be reduced compared to an arrangement as described in DE 101 34 115 A1, which provides a control valve for each of the clutches and for each of the actuators for engaging/releasing the gears.

In the case of the control apparatus described in DE 41 17 736 C1, only one pressure-regulating valve can be connected by the switching apparatus to the actuators for shifting the gears, while the other pressure-regulating valve can be connected only to either one clutch or the other. If one pressure-regulating valve fails, it is no longer possible to shift the gears.

SUMMARY OF THE INVENTION

The invention is based on the object of providing a hydraulic control apparatus for an automatic dual clutch transmission which is of simple and inexpensive construction and as far as possible ensures all the required functions for shifting of the gears and for actuating the clutches even in the event of one of its components failing.

The object on which the invention is based is achieved by the control apparatus according to the invention. The control apparatus is distinguished by the fact that the first switching valve in a first position $A_I$ connects the first control valve to the first clutch and disconnects it from the shifting system and in a position $B_I$ connects the first control valve to the shifting system and disconnects it from the first clutch, and that the second switching valve in a position $A_{II}$ connects the second control valve to the second clutch and disconnects it from the shifting system and in a position $B_{II}$ connects the second control valve to the shifting system and disconnects it from the second clutch.

The arrangement of the control valves and the switching valves in accordance with the invention, by adopting suitable positions $B_I$, $B_{II}$, allows the shifting system for shifting the gears to be connected to both control valves. This provides the option of both the first control valve and the second control valve being able to provide a controlled pressure or controlled volumetric flow for the shifting system. The control apparatus according to the invention therefore allows the gears to be shifted irrespective of which of the two control valves fails.

Moreover, the control apparatus according to the invention has the advantage that both the two clutches can be actuated and the gears can be shifted by means of just two control valves. This allows the costs involved in producing a control apparatus of this type to be kept at a low level, since control valves, such as a pressure regulator or a flow regulator, are more expensive than switching valves.

In a preferred exemplary embodiment, a switching means is provided between the first control valve and between the second control valve and the shifting system, which switching means ensures that the shifting system is acted on either by the pressure/volumetric flow of the first control valve or by the pressure/volumetric flow of the second control valve. This switching means serves to disconnect the connection between the shifting system and the control valve which is not (instantaneously) intended for the actuation of the shifting system or cannot perform the actuation on account of a fault. Therefore, the actuation of the shifting system is not impaired by the undesirable superimposed effect of two control valves, one of which may be defective.

The switching means is preferably designed as a changeover valve. The changeover valve in this case has a first inlet and a second inlet and also an outlet, the first inlet being connected to the first control valve and the second inlet being connected to the second control valve. The outlet of the switching means is connected to the shifting system. The changeover valve produces a connection between outlet and that inlet at which the pressure is higher, while at the same time disconnecting the connection between outlet and the inlet which is at the lower pressure.

In a preferred exemplary embodiment, in position $B_I$ of the first switching valve and in position $B_{II}$ of the second switching valve, the first control valve is connected to the second clutch and the second control valve is connected to the first clutch. As a result, the first and second clutches can continue to be actuated even when one of the control valves has failed. For example, if the first control valve has failed, the first clutch can be actuated by means of the second control valve provided that the first and second switching valves are respectively in positions $B_I$, $B_{II}$. The second clutch can likewise continue to be actuated by the second control valve when it is switched to position $A_{II}$. Independently of this, the second control valve can continue to control the shifting system when the second switching valve is in position $B_{II}$. Although shifting without interruption to the traction force is no longer possible in the event of a control valve failing, the dual clutch transmission can continue to be shifted into every gear and can also continue to be operated in this gear.

Preferably, the control apparatus has a group selector, by means of which the control unit is connected either to a first group of actuators assigned to the first partial transmission or to a second group of actuators assigned to the second partial transmission. This group selector may comprise a valve with preferably two positions, in which case in a first position the controlled pressure/volumetric flow of the control unit is passed to the first group of actuators and in a second position the controlled pressure/volumetric flow is passed to the second group of actuators. At the same time, in the first position of the valve, the group selector disconnects the connection between control unit and the second group of actuators. In a similar way, in the second position the first group of actuators is disconnected from the control unit.

Furthermore, it is possible to provide an actuator selector, by which the control unit is connected to one of the actuators from the first or second group. By way of example, if a group comprises two actuators, the actuator selector may include a valve with two switching positions, so that in each case one actuator is selected and the other is disconnected from the control unit.

If the actuators for shifting the gears are designed as shifting cylinders which can be actuated on two sides, a chamber selector is provided, by which the control unit is connected either to a first chamber or to a second chamber of the shifting cylinder. The shifting cylinder which can be actuated on two sides allows a shifting fork connected to it to be accurately controlled in two opposite directions, so that it can engage two gears starting from a middle neutral position. The chamber selector may have valves, which are preferably actuated by means of a common signaling element.

The group selector, the actuator selector and the chamber selector with their associated valves are preferably connected in series. A series connection of this type, for example if there are four shifting cylinders which can be actuated on two sides, allows the eight individual chambers of the shifting cylinders to be actuated individually if the series-connected valves (valve of the group selector, valve of the actuator selector and valve of the chamber selector) can each adopt two switching positions.

In a preferred exemplary embodiment, the group selector can be actuated by a signaling element which is also used to actuate at least one of the two switching valves. This enables the valve of the group selector to be switched using the same signal which is used to switch one of the two switching valves. If, for example, the second clutch is to be opened, a signal from the signaling element switches the second switching valve to position $B_{II}$. On account of the clutch being opened, the second partial transmission assigned to it is free of torque. At the same time, the signal actuates the valve of the group selector, which then selects the group of actuators assigned to the second partial transmission. The gears of the second partial transmission can then be engaged or released. In this exemplary embodiment, the simultaneously utilization of the signal for at least one switching valve and for the valve of the group selector rules out the risk of shifting gears in a partial transmission which is under load.

The shifting order and shifting logic within the control apparatus according to the invention can be varied as desired. A method for controlling the dual clutch transmission using the control apparatus in accordance with the embodiment described above has proven advantageous in which prior to switching from position $B_I$, $B_{II}$ to position $A_I$, $A_{II}$ of the first or second switching valve, the pressure of the control valve assigned to the switching valve is set to a value which depends on the subsequent actuation of the clutch which is acted on by the pressure/volumetric flow of the control valve after switching to position $A_I$, $A_{II}$ of the switching valve. This reduces the time for a shifting sequence to a minimum, since on account of the arrangement of control and switching valve in accordance with the invention, the shifting system and the clutch which is to be closed are actuated in succession.

Prior to switching from position $A_I$, $A_{II}$ to $B_I$, $B_{II}$ of the first or second switching valve, the clutch can be opened by reducing the pressure of the pressure valve assigned to the switching valve. This allows the clutch to be disconnected without the corresponding switching valve having to be switched. Of course, the clutch can continue to be disconnected by the switching of a switching valve, depending on the particular circumstances.

The invention is explained in more detail on the basis of the exemplary embodiments illustrated in the figures, in which:

DETAILED DESCRIPTION OF THE DRAWINGS

Figure 1:
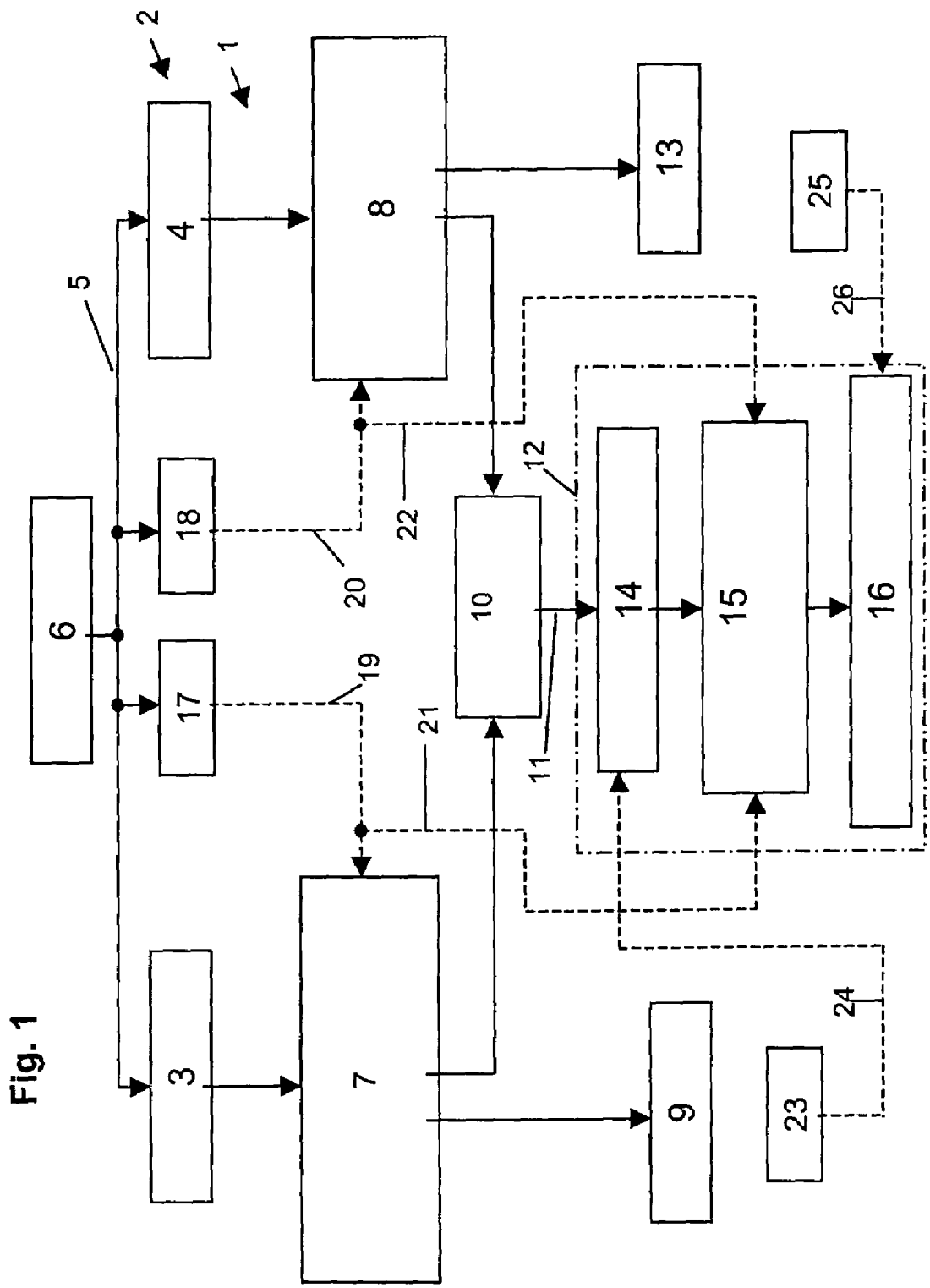
FIG. 1 diagrammatically depicts a first exemplary embodiment of the invention.

FIG. 1 diagrammatically depicts a hydraulic control apparatus according to the invention, which is denoted overall by 1. The control apparatus 1 comprises a control unit 2 having a first pressure-regulating valve or pressure regulator 3 and a second pressure regulator 4. On the inlet side, the two pressure regulators 3, 4 are connected to a manifold line 5, to which an operating pressure 6 is applied. The first pressure regulator 3 is assigned a first switching valve 7, and the second pressure regulator 4 is assigned a second switching valve 8. The first switching valve 7 can be used to connect the first pressure regulator 3 either to a first clutch 9 or to a switching means 10, which is designed as a pressure switching means and is connected to a shifting system 12 via a line 11. The second switching valve 8 can be used to connect a controlled pressure from the second pressure regulator 4 either to the pressure switching means 10 or to a second clutch 13.

The control apparatus 1 can be used to control a dual clutch transmission with two separate clutches (first and second clutch 9, 13) and with a plurality of actuators, by means of which individual gears of the transmission can be engaged or released. The dual clutch transmission comprises a first partial transmission and a second partial transmission, which are assigned to the first and second clutches, respectively. If a pressure is applied to a clutch cylinder of a clutch, the clutch, which is otherwise held open by a spring force, is closed. In the closed state, the clutch transmits a torque between a drive unit, such as an internal combustion engine, and the associated partial transmission.

The shifting system 12 comprises an actuator selector 14, a group selector 15 and an actuator chamber selector 16. As can be seen from FIG. 1, the actuator selector 14, the group selector 15 and the actuator chamber selector 16 are connected in series. The series connection allows the selection of one specific chamber of an actuator of a group, so that a pressure medium with a modeled pressure can be passed into this selected chamber from one of the two pressure regulators 3, 4 via the pressure switching means 10 and via the line 11.

A signaling element 17 and a signaling element 18 are provided for actuating the first switching valve 7 and the second switching valve 8, respectively. The signaling element 17 passes a signal or a signal pressure via a signal line 19 to the first switching valve 7. The switching valve 7 can be actuated or switched by the signal. The second switching valve 8 is switched by a signal which is generated by the signaling unit 18 and is passed via a signal line 20.

The signaling element 17 is connected to the group selector 15 via a signal line 21, which leads from the signal line 19. The signaling element 18 is likewise connected to the group selector 15, via a signal line 22. On account of the signal lines 21, 22, it is possible for the group selector 15 to be actuated by signals from the signaling elements 17, 18. There is therefore no need for a separate signaling element for the group selector 15.

The actuator selector 14 is actuated by means of a signaling element 23 which is connected to the actuator selector 14 via a signal line 24. The actuator chamber selector 16 is switched/actuated by means of a signal from the signaling element 25. A signal line 26 connects the actuator chamber selector 16 to the signaling element 25.

Figure 2:
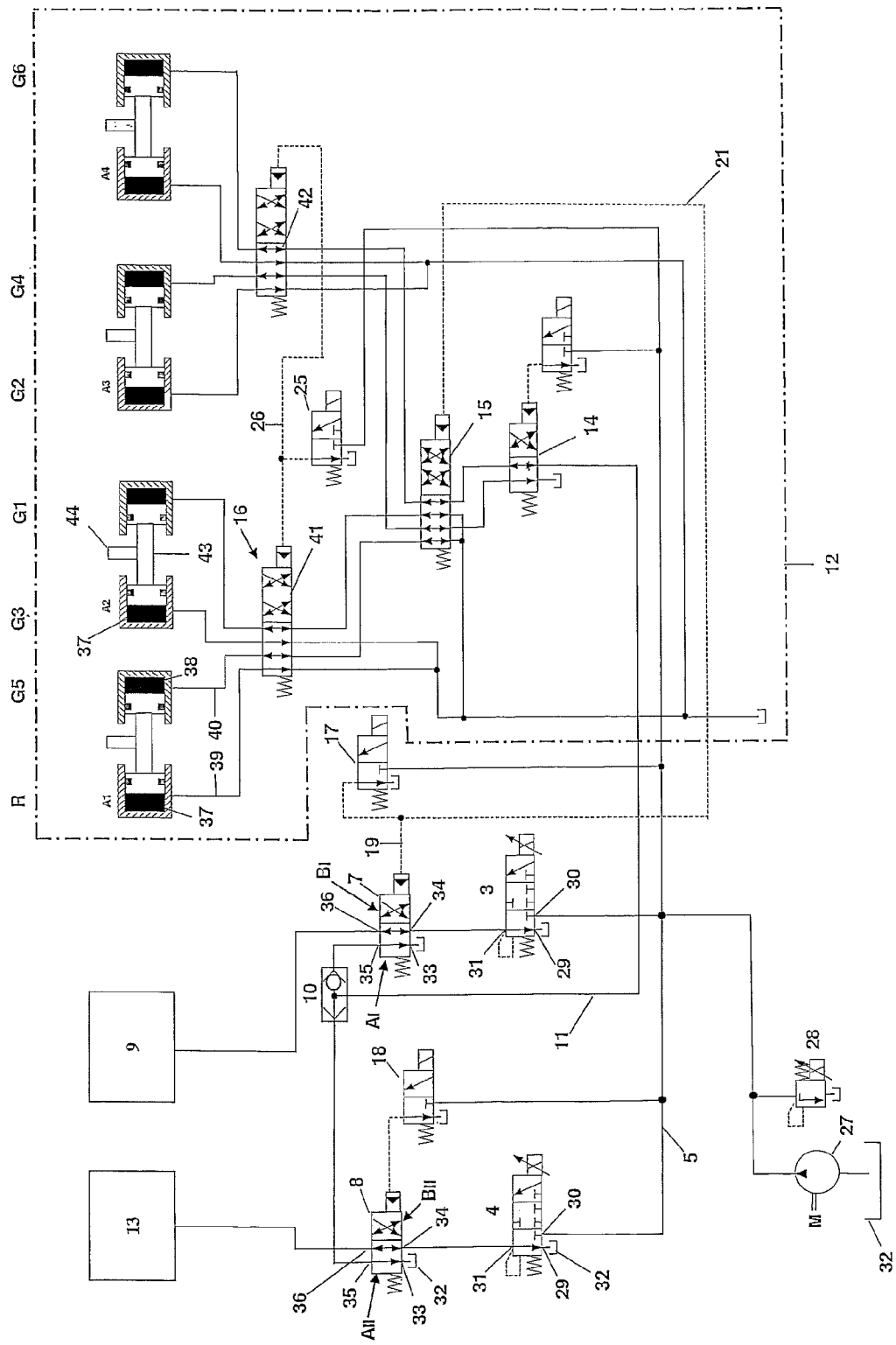
FIG. 2 shows a block diagram of a preferred implementation of the exemplary embodiment shown in FIG. 1.

FIG. 2 shows a block diagram of a preferred implementation of the exemplary embodiment shown in FIG. 1. A pump 27 in communication with a main pressure regulator 28 supplies the operating pressure 6 (cf. FIG. 1) which is present in the manifold line 5.

The two pressure regulators 3, 4 are each designed as 3/3-way valves with two inlets 29, 30 and an outlet 31. The inlet 29 is in this case connected to an oil sump 32, and the inlet 30 to the manifold line 5. The outlet 31 of each pressure regulator 3, 4 leads to the associated switching valve 7, 8, which is in each case designed as a 4/2-way valve. The 4/2-way valve 7, 8 has two inlets 33, 34 and two outlets 35, 36. The inlet 33 is connected to the oil sump 32, while the inlet 34 is connected to the outlet 31 of the associated pressure regulator 3, 4. The outlet 35 is connected to the shifting system 12, via the pressure switching means 10 and the line 11. The outlet 36 of the switching valves 7, 8 leads to the clutch 9 or to the clutch 13.

The signaling element 17, in this case designed as a 3/2-way switching valve, is connected upstream of the switching valve 7 and in the electrically excited state passes the operating pressure 6 of the manifold line 5 onto the switching valve 7, so that the latter is switched out of a spring-loaded at-rest position, a position $A_I$, into the position $B_I$. Like the signaling element 17, the signaling element 18 connected upstream of the switching valve 8 is designed as a 3/2-way switching valve which adopts the position $A_{II}$ in the at-rest position and the position $B_{II}$ when a signal or control pressure is applied.

In the state illustrated in FIG. 2, the first switching valve 7 produces a connection between the first pressure regulator 3 and the first clutch 9. The second switching valve 8 is also in the position $A_{II}$ in which the second clutch 13 and the second pressure regulator 4 are connected to one another. In these positions $A_I$, $A_{II}$, the two clutches 9, 13 are each acted on by a controlled pressure, so that both clutches can transmit a torque simultaneously for a certain overlap phase in accordance with the controlled pressures from the pressure regulators 3, 4.

The shifting system 12 comprises four actuators A1, A2, A3, A4, which are each designed as shifting cylinders which can be actuated on two sides. A shifting cylinder A1, A2, A3, A4 in each case has a first chamber 37 and a second chamber 38, which are connected via a line 39, 40 to the actuator chamber selector 16, which comprises two 8/2-way valves 41, 42. The two switching valves 41, 42 are actuated jointly by the signaling element 25 in the form of a 3/2-way switching valve via the signal line 26.

The control apparatus 1 illustrated in FIG. 2 is designed to control a dual clutch transmission having six forward gears G1 to G6 and one reverse gear R. In each case two gears can be engaged with the aid of the shifting cylinders A1, A2, A3, while gear G6 can be engaged by the shifting cylinder A4. If, for example, pressure is applied to the first chamber 37 of the shifting cylinder A2, a double piston 43 with a shifting fork 44 (only diagrammatically indicated) connected to it is pressed to one side (to the right in the illustration presented in FIG. 2), with the result that the gear G1 is engaged.

The groups selector 15, which selects either the shifting cylinders A1, A2 or the shifting cylinders A3, A4, is connected upstream of the switching valves 41, 42 for selecting the first or second chamber, so that a modeled pressure can pass via the line 11 into one of the chambers of the shifting cylinders which have then been selected. The actuator selector 14 in the form of a 4/2-way switching valve is arranged between the group selector 15, which comprises an 8/2-way switching valve, and the pressure switching means 10. The switching valve 14 is actuated by means of the signaling element 23, in this case designed as an electrically actuable 3/2-way switching valve. The switching valve 15, by contrast, does not have a signaling element assigned to it, since it is connected to the signaling element 17 via the signal line 19 and 21.

The shifting cylinders A1, A2 comprising the gears R, G5, G3, G1 are assigned to the first partial transmission, which can be connected to the drive unit (not shown here) via the first clutch 9. Accordingly, the shifting cylinders A3, A4 comprising the gears G2, G4, G6 belong to the second partial transmission, which is assigned to the second clutch 13.

If, for example, the signaling element 17 is electrically actuated, a signal or control pressure is passed via the signal line 19 to the first switching valve 7, with the result that the latter is pressed into position $B_I$ counter to the spring force. In this position $B_I$, the first clutch 9 is disconnected from the pressure regulator, and the pressurized medium (oil) in the associated clutch cylinder is passed via the outlet 35 and inlet 33 of the first switching valve 7 to the oil sump 32. As a result, the pressure in the clutch cylinder drops and the clutch opens. There is no longer any torque at the associated first partial transmission comprising the gears R, G1, G2 and G3. When the second switching valve 7 is in the position illustrated in FIG. 2 (position $A_{II}$), the second clutch 13 is acted on by the pressure of the pressure regulator 4, so that the clutch 13 can transmit a torque between the engine and the associated second partial transmission comprising the gears G2, G4 and G6.

The signal or control pressure of the switching valve 17 is also passed to the group selector 15 via the line 21 and causes the shifting cylinders A1 and A2 to be selected or a connection to be produced between these shifting cylinders and the pressure switching means 10. In position $B_{II}$ of the first switching valve 7, the controlled pressure of the first pressure regulator 3 is applied to the pressure switching means 10 which, at least when the second switching valve is in the position $A_{II}$ shown in FIG. 2, opens the path to the shifting system 12. On account of the presence of the signal from the switching valve 17, the group selector selects the shifting cylinders A1, A2, so that a gear G1, G3, G5 or R of the now load-free first partial transmission can be engaged via a corresponding position of the actuator selector 14 and the chamber selector 16. The common actuation of the first switching valve 7 and of the group selector 14 prevents gears in a partial transmission from being shifted under load.

Figure 3:
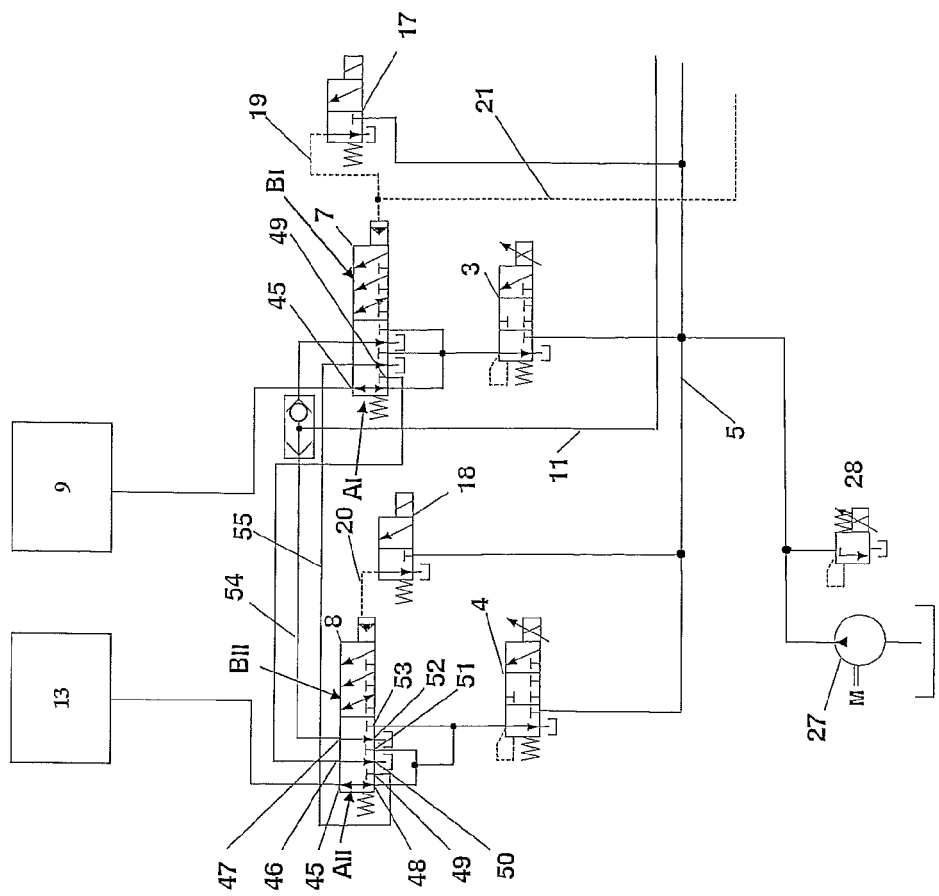
FIG. 3 shows part of a further exemplary embodiment, which has a modified shifting apparatus compared to the exemplary embodiment shown in FIG. 2.

FIG. 3 shows part of a block diagram which is modified with respect to the exemplary embodiment shown in FIG. 2. For simplicity, the shifting system 12 shown in FIG. 2 is not illustrated in FIG. 3 since it is the same. In analogy to FIG. 2, the manifold line 5, line 11 and signal line 21 shown in FIG. 3 are connected to the shifting system 12 shown in FIG. 2. The exemplary embodiment shown in FIG. 2 differs in terms of the switching valves 7, 8 used and the connection between the valves, the pressure switching means 10 and the two clutches 7, 8.

In the exemplary embodiment shown in FIG. 3, the first switching valve 7 and also the second switching valve 8 are designed as structurally identical 9/2-way switching valve with three outlets 45, 46, 47 and six inlets 48 to 53. In position $A_{II}$ (illustrated in FIG. 3), the switching valve 8 produces a connection, via the inlet 48 and the outlet 45, between the second pressure regulator 4 and the second clutch 13. In the other position $B_{II}$, the second pressure regulator 4 and the pressure switching means 10 are connected to one another via the inlet 53 and the outlet 48, thereby providing the possibility of pressure regulation for shifting of the gears. At the same time, a connection is produced between the second pressure regulator 4 and a line 54 leading to the first switching valve 7, via the inlet 51 and the outlet 46. The line 54 is connected to the inlet 49 of the first switching valve 7 and, via the outlet 45 of the latter, enables pressure to be applied to the first clutch 9 by the second pressure regulator 4 in position $B_I$ of the first switching valve 7.

Accordingly, there is a further line 55, which connects the two switching valves 7, 8 and can be used to actuate the second clutch 13 with the first pressure regulator 3 when the two switching valves each adopt the position $B_I$, $B_{II}$. This arrangement allows all gears of the dual clutch transmission to continue to be used even in the event of a pressure regulator failing.

To shorten the time required to shift a gear, in a final phase, in which a gear is engaged in position $B_I$ of the first switching valve 7, for example by means of the first pressure regulator 3, the set value for the pressure which is to be regulated can be set to a value required for the subsequent actuation of the (still) open first clutch 9. If, after a gear has been engaged, the first switching valve is switched into position $A_I$, the required, preset pressure value is instantaneously applied to the first clutch.

| List of designations | |
|---|---|
| 1 | Control apparatus |
| 2 | Control unit |
| 3 | First pressure regulator |
| 4 | Second pressure regulator |
| 5 | Manifold line |
| 6 | Operating pressure |
| 7 | First switching valve |
| 8 | Second switching valve |
| 9 | First clutch |
| 10 | Switching means |
| 11 | Line |
| 12 | Shifting system |
| 13 | Second clutch |
| 14 | Actuator selector |
| 15 | Group selector |
| 16 | Actuator chamber selector |
| 17 | Signaling element |
| 18 | Signaling element |
| 19 | Signal line |
| 20 | Signal line |
| 21 | Signal line |
| 22 | Signal line |
| 23 | Signaling element |
| 24 | Signal line |
| 25 | Signaling element |
| 26 | Signal line |
| 27 | Pump |
| 28 | Main pressure regulator |
| 29 | Inlet |
| 30 | Inlet |

-continued

| List of designations | |
|---|---|
| 31 | Outlet |
| 32 | Oil sump |
| 33 | Inlet |
| 34 | Inlet |
| 35 | Outlet |
| 36 | Outlet |
| 37 | First chamber |
| 38 | Second chamber |
| 39 | Line |
| 40 | Line |
| 41 | 8/2-way switching valve |
| 42 | 8/2-way switching valve |
| 43 | Double piston |
| 44 | Shifting fork |
| 45 | Outlet |
| 46 | Outlet |
| 47 | Outlet |
| 48 | Inlet |
| 49 | Inlet |
| 50 | Inlet |
| 51 | Inlet |
| 52 | Inlet |
| 53 | Inlet |
| 54 | Line |
| 55 | Line |
| A, A2, A3, A4 | Actuator |
| R, G1 to G6 | Gear |

The invention claimed is:

1. A hydraulic control apparatus for an automatic dual clutch transmission, which includes first clutch with a first partial transmission and a second clutch with a second partial transmission, as well as a shifting system for engaging/releasing gears of the two partial transmissions, having a control unit which predetermines at least one of controllable pressure and controllable volumetric flow for the actuation of the first and second clutches and for the actuation of the shifting system, and having a switching apparatus that is arranged between the control unit and the clutches and the control unit and the shifting system and can be used to switch the controllable pressure or the controllable volumetric flow onto the clutches or the shifting system, the control unit having a first pressure regulator and a second pressure regulator, and the switching apparatus having a first switching valve and a second switching valve, wherein the first switching valve
 a) in a first position ($A_I$) connects the first pressure regulator to the first clutch and disconnects the first pressure regulator from the shifting system, and
 b) in a second position ($B_I$) connects the first pressure regulator to the shifting system and disconnects the first pressure regulator from the first clutch; and the second switching valve
 c) in a first position ($A_{II}$) connects the second pressure regulator to the second clutch and disconnects second pressure regulator from the shifting system, and
 d) in a second position ($B_{II}$) connects the second pressure regulator to the shifting system and disconnects second pressure regulator from the second clutch.

2. The control apparatus as claimed in claim 1, wherein in the second position ($B_I$) of the first switching valve and in the second position ($B_{II}$) of the second switching valve a connection is produced between the first pressure regulator and the second clutch and a connection is produced between the second pressure regulator and the first clutch.

3. The control apparatus as claimed in claim 1, wherein a chamber selector is provided by means of which the control unit is connected either to a first chamber or to a second chamber of an actuator.

4. The control apparatus as claimed in claim 1, wherein a switching means is provided between the first switching valve and between the second switching valve and the shifting system, which switching means ensures that the shifting system is acted on either by the pressure/volumetric flow of the first switching valve or by the pressure/volumetric flow of the second switching valve.

5. The control apparatus as claimed in claim 4, wherein the switching means is designed as a changeover valve.

6. The control apparatus as claimed in claim 1, wherein a group selector is provided by means of which the control unit is connected either to a first group of actuators assigned to the first partial transmission or to a second group of actuators assigned to the second partial transmission.

7. The control apparatus as claimed in claim 6, wherein the group selector is actuated by a signal which is used to actuate at least one of the two switching valves.

8. The control apparatus as claimed in claim 6, wherein an actuator selector is provided by means of which the control unit is connected to one of the actuators from the first or second group.

9. The control apparatus as claimed in claim 8, wherein
a chamber selector is provided by means of which the control unit is connected either to a first chamber or to a second chamber of an actuator; and
the group selector, the actuator selector and the chamber selector are connected in series.

10. A method for controlling a dual clutch transmission using a hydraulic control apparatus for an automatic dual clutch transmission, including the method steps:
providing a first clutch with a first partial transmission and a second clutch with a second partial transmission, as well as a shifting system for engaging/releasing gears of the two partial transmissions, having a control unit;
predetermining by means of said control unit at least one of controllable pressure and controllable volumetric flow for the actuation of the first and second clutches and for the actuation of the shifting system, and
providing a switching apparatus that is arranged between the control unit and the clutches and the control unit and the shifting system and can be used to switch the controllable pressure or the controllable volumetric flow onto the clutches or the shifting system, the control unit having a first pressure regulator and a second pressure regulator, and the switching apparratus having a first switching valve and a second switching valve,
operating the first switching valve so that the first switching valve
a) in a first position ($A_I$) connects the first pressure regulator to the first clutch and disconnects the first pressure regulator from the shifting system, and
b) in a second position ($B_I$) connects the first pressure regulator to the shifting system and disconnects the first pressure regulator from the first clutch; and
operating the second switching valve so that the second switching valve
c) in a first position ($A_{II}$) connects the second pressure regulator to the second clutch and disconnects the second pressure regulator from the shifting system, and
d) in a second position ($B_{II}$) connects the second pressure regulator to the shifting system and disconnects the second pressure regulator from the second clutch, setting the pressure of the pressure regulator prior to switching the first switching valve from second position ($B_I$) to the first position ($A_I$) or prior to switching the second switching valve from the second position ($B_{II}$) to the first position ($A_{II}$) to a value which depends on the subsequent actuation of the clutch that is acted on by the pressure of the pressure regulator after the first switching valve has been switched to the first position ($A_I$) and the second switching valve has been switched to the first position ($A_{II}$).

11. The method as claimed in claim 10, wherein the method comprises the method step of opening the first clutch by reducing the pressure of the pressure regulator prior to switching the first switching valve from second position ($B_I$) to the first position ($A_I$) or opening the second clutch prior to switching the second switching valve from the second position ($B_{II}$) to the first position ($A_{II}$).

12. A hydraulic control apparatus for an automatic dual clutch transmission, which includes a first clutch with a first partial transmission and a second clutch with a second partial transmission, as well as a shifting system for engaging/releasing gears of the two partial transmissions, having a control unit which predetermines at least one of controllable pressure and controllable volumetric flow for the actuation of the first and second clutches and for the actuation of the shifting system, and having a switching apparatus that is arranged between the control unit and the clutches and the control unit and the shifting system and can be used to switch the controllable pressure or the controllable volumetric flow onto the clutches or the shifting system, the control unit having a first pressure regulator and a second pressure regulator, and the switching apparatus having a first switching valve and a second switching valve, wherein
the first switching valve and also the second switching valve are designed as structurally identical 9/2-way switching valve with three outlets and six inlets;
the first switching valve has a first position ($A_I$) and a second position ($B_I$) and the second switching valve has a first position ($A_{II}$) and a second position ($B_{II}$);
a) in the first position ($A_{II}$) of the second switching valve, said second switching valve produces a connection, via the inlet and the outlet, between the second pressure regulator and the second clutch;
b) in the second position ($B_{II}$) of the second switching valve, the second pressure regulator and a pressure switching means are connected to one another via the inlet and the outlet, thereby providing the possibility of pressure regulation for shifting of the gears while at the same time, and a connection is produced between the second pressure regulator and a line leading to the first switching valve, via the inlet and the outlet, and the line is connected to the inlet of the first switching valve and, via the outlet of the first switching valve;
c) in a first position ($B_I$) of the first switching valve pressure is applied to the first clutch by the second pressure regulator;
d) in the second position ($B_I$) of the first switching valve and the second position ($B_{II}$) of the second switching valve the second clutch is actuated with the first pressure regulator since a further line connects the two switching valves;
e) in the first position ($A_I$) of the first pressure regulator a preset pressure is applied to the first clutch.

13. The control apparatus as claimed in claim 12, wherein the pressure switching means is designed as a changeover valve.

14. The control apparatus as claimed in claim 12, wherein a chamber selector is provided by means of which the control unit is connected either to a first chamber or to a second chamber of an actuator.

15. The control apparatus as claimed in claim 12, wherein a group selector is provided by means of which the control unit is connected either to a first group of actuators assigned to the first partial transmission or to a second group of actuators assigned to the second partial transmission.

16. The control apparatus as claimed in claim 15, wherein the group selector is actuated by a signal which is used to actuate at least one of the two switching valves.

17. The control apparatus as claimed in claim 15, wherein an actuator selector is provided by means of which the control unit is connected to one of the actuators from the first or second group.

18. The control apparatus as claimed in claim 17, wherein a chamber selector is provided by means of which the control unit is connected either to a first chamber or to a second chamber of an actuator; and the group selector, the actuator selector and the chamber selector are connected in series.

* * * * *